(12) United States Patent
Shi et al.

(10) Patent No.: US 7,306,480 B2
(45) Date of Patent: Dec. 11, 2007

(54) WIRE HOLDER FOR ELECTRONIC DEVICE

(75) Inventors: Zheng Shi, Shenzhen (CN);
Hung-Chun Lu, Tu-Cheng (TW);
Guang-Yao Lee, Tu-Cheng (TW);
Chun-Chi Liang, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,268

(22) Filed: Jul. 21, 2006

(65) Prior Publication Data

US 2007/0155225 A1 Jul. 5, 2007

(30) Foreign Application Priority Data

Jan. 3, 2006 (CN) ................... 200620053232.4

(51) Int. Cl.
*H01R 13/72* (2006.01)
*H01R 25/00* (2006.01)

(52) U.S. Cl. ..................... 439/501; 439/110

(58) Field of Classification Search ............. 439/752, 439/677, 110, 137, 399, 131, 501, 502, 503
See application file for complete search history.

(56) References Cited

U.S. PATENT DOCUMENTS

| 4,984,982 | A | * | 1/1991 | Brownlie et al. ........... 439/131 |
| 5,547,391 | A | * | 8/1996 | Benes et al. ................ 439/399 |
| 6,249,636 | B1 | * | 6/2001 | Daoud ........................ 385/137 |
| 6,343,942 | B1 | * | 2/2002 | Okamoto .................... 439/110 |
| 6,428,363 | B2 | * | 8/2002 | Tamai et al. ................ 439/677 |
| 2001/0053636 | A1 | * | 12/2001 | Tamai et al. ................ 439/677 |

* cited by examiner

*Primary Examiner*—Chandrika Prasad
(74) *Attorney, Agent, or Firm*—Wei Te Chung

(57) ABSTRACT

A wire holder for fixing two or more wires on a plate of an electronic device includes a fixing portion and a latch formed on the plate. The fixing portion includes two sidewalls, and the latch is formed between the sidewalls. The latch includes a main body, two elastic arms extending from two lateral ends of the main body toward the sidewalls respectively. Two latching portions are formed on top portions of the elastic arms respectively, and the latching portions extend toward directions contrary to extending directions of the corresponding elastic arms.

14 Claims, 2 Drawing Sheets

WIRE HOLDER FOR ELECTRONIC DEVICE

CROSS-REFERENCES TO RELATED APPLICATION

Relevant subject matter is disclosed in two copending U.S. patent applications with application Ser. Nos. 11/309,267, and 11/309,269, filed on the same date and having a same title with the present application, which are assigned to the same assignee with this patent application.

DESCRIPTION

1. Field of the Invention

The present invention relates to a wire holder, and more particularly to a wire holder in an electronic device.

2. Description of Related Art

Typically, there are a plurality of wires in an electronic device such as a portable computer, and the wires are fixed in the electronic device by a wire holding recess. However, the wire holding recess may not fit the wires properly. If the wire holding recess is too wide, the wires are not fixed firmly and may fall out. If the wire holding recess is too narrow, the wires are fixed too firmly causing difficulty if they need to be removed, and the wires may be easily scraped during removal. Further more, the wires are twisted together, thereby it is troublesome to detach and remove only one of the wires if needed.

What is needed, therefore, is a wire holder in which wires are fixed firmly, but can still be easily removed when necessary.

SUMMARY OF THE INVENTION

An exemplary wire holder for fixing two or more wires on a plate of an electronic device is provided. The wire holder includes a fixing portion and a latch formed on the plate. The fixing portion includes two sidewalls, and the latch is formed between the sidewalls. The latch includes a main body, two elastic arms extending from two lateral ends of the main body toward the sidewalls respectively. Two latching portions are formed on top portions of the elastic arms respectively, and the latching portions extend toward directions contrary to extending directions of the corresponding elastic arms.

Other advantages and novel features will become more apparent from the following detailed description of preferred embodiment when taken in conjunction with the accompanying drawings, in which:

DETAILED DESCRIPTION OF THE INVENTION

Figure 1:
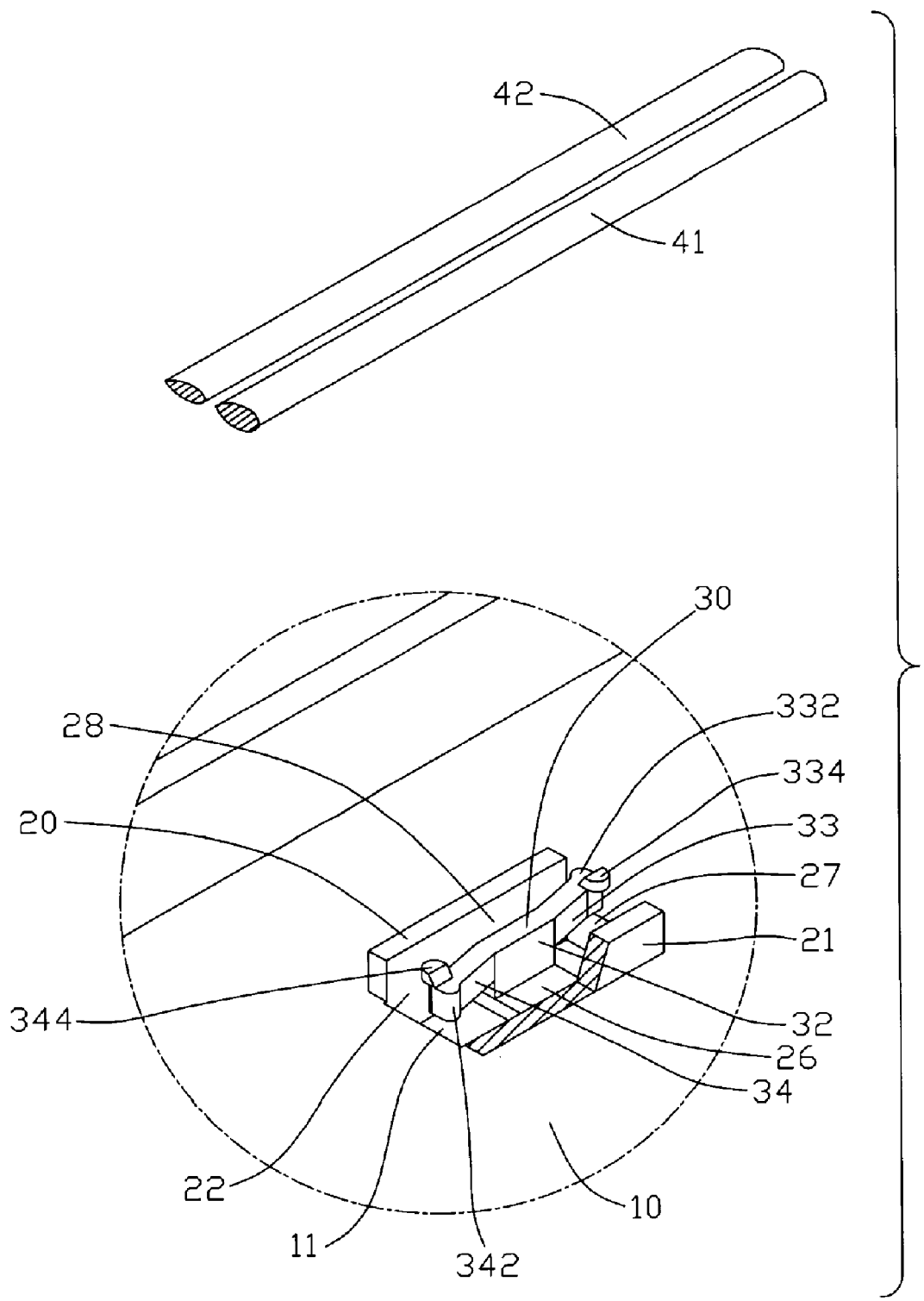
FIG. 1 is an exploded, partially sectioned isometric view of a wire holder and a wire in accordance with a preferred embodiment of the present invention.

Referring to FIG. 1, a wire holder for fixing a first wire 41 and a second wire 42 on a plate 10 of an electronic device is provided in accordance with a preferred embodiment of the present invention. Of course, the first wire 41 and the second wire 42 may be more than one wire. The wire holder includes a plurality of fixing portions 20 and a plurality of latches 30 formed on the plate 10. In this embodiment, the electronic device is a portable computer, and the plate 10 is an inside surface of a panel of an enclosure of the portable computer.

Each fixing portion 20 includes a first sidewall 21 and a second sidewall 22, two apertures 11 are defined in the plate 10 between the first sidewall 21 and the second sidewall 22, and a connecting portion 26 is formed between the apertures 11. A latch 30 is formed on the connecting portion 26. The latch 30 includes a main body 32, a first elastic arm 33 and a second elastic arm 34 extending from two lateral ends of the main body 32 respectively. The first elastic arm 33 and the second elastic arm 34 cantilever over the aperture 11, and slantingly extending toward the second sidewall 22 and the first sidewall 21 respectively. An arcuate flange 332 is formed adjacent a free end of the first elastic arm 33 toward the second sidewall 22, and a latching portion 334 is formed on a top portion of the first elastic arm 33 and adjacent the free end thereof toward the first sidewall 21. An arcuate flange 342 is formed adjacent a free end of the second elastic arm 34 toward the first sidewall 21, and a latching portion 344 is formed on a top portion of the second elastic arm 34 and adjacent the free end thereof toward the second sidewall 22. The latch 30 and the first sidewall 21 cooperatively define a first guiding slot 27 therebetween for receiving the first wire 41. The latch 30 and the second sidewall 22 cooperatively define a second guiding slot 28 therebetween for receiving the second wire 42.

Figure 2:
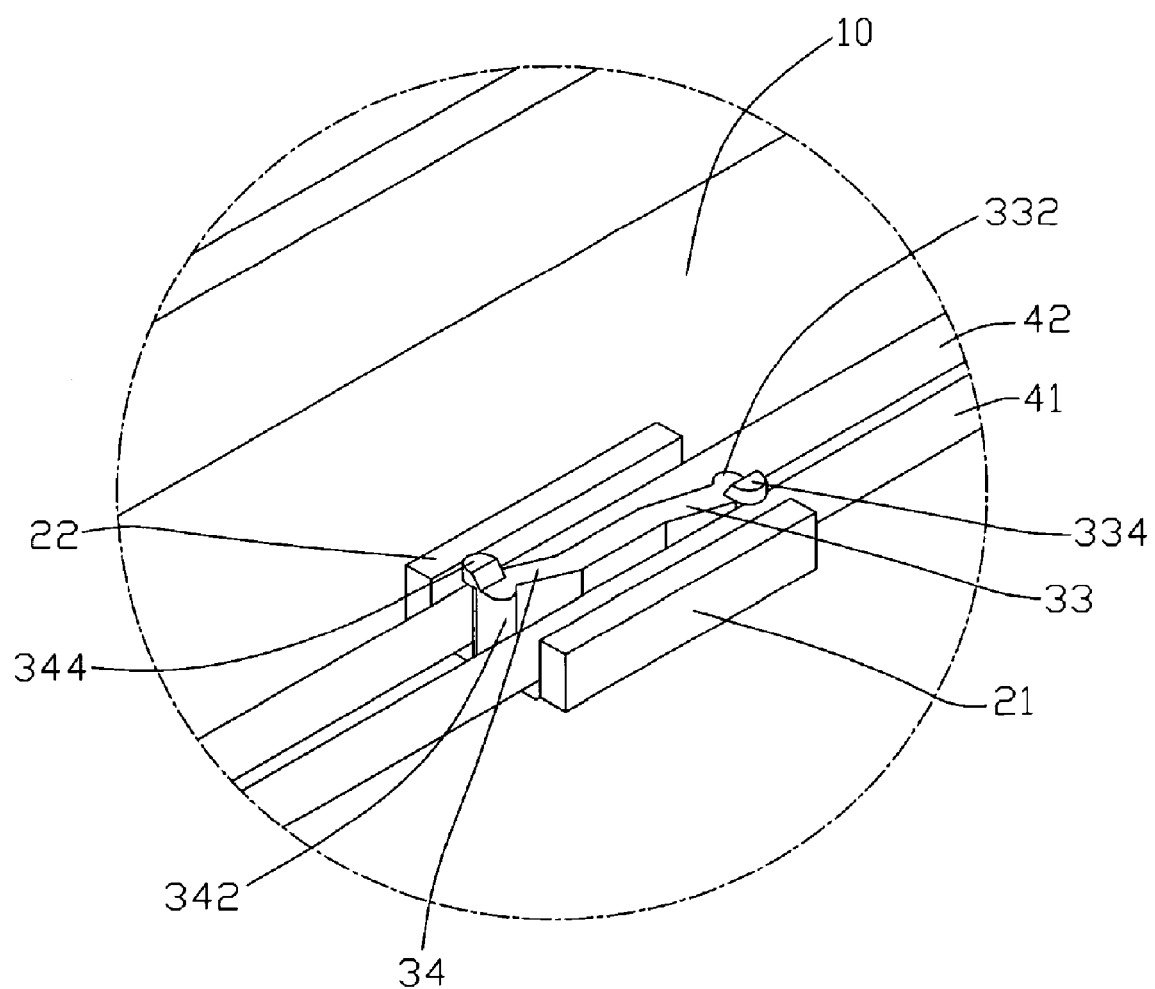
FIG. 2 is an assembled view of FIG. 1.

Referring also to FIG. 2, in assembly, the first wire 41 is partially pressed into the first guiding slot 27 between the first elastic arm 33 and the first sidewall 21, and then the second wire 42 is entirely pressed into the second guiding slot 28. The second wire 42 presses the flange 332 of the first elastic arm 33, and the first elastic arm 33 deforms toward the first wire 41, and then the latching portion 334 of the first elastic arm 33 presses against the top of the first wire 41, thereby the first wire 41 is partially fixed in the first guiding slot 27. Pressing the first wire 41 entirely into the first guiding slot 27 between the second elastic arm 34 and the first sidewall 21, the first wire 41 presses the flange 342 of the second elastic arm 34, and the second elastic arm 34 deforms toward the second wire 42, and then the latching portion 344 of the second elastic arm 34 presses against the top of the second wire 42, thereby the second wire 42 is entirely fixed in the second guiding slot 28.

To detach the wires from the plate 10, the first wire 41 and the second wire 42 at the right of the fixing portion 20 are pulled up, the second wire 42 is partially removed from the second guiding slot 28 between the first elastic arm 33 and the second sidewall 22, and then the first elastic arm 33 rebounds. The latching portion 334 of the first elastic arm 33 is disengaged from the first wire 41, and the first wire 41 is entirely removed from the first guiding slot 27 by being pulled. Then the second elastic arm 34 rebounds toward the first sidewall 21, the latching portion 344 of the second elastic arm 34 is disengaged from the second wire 42, and the second wire 42 is entirely removed from the second guiding slot 28.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

What is claimed is:

1. A wire holder for fixing two wires on a plate of an electronic device, the wire holder comprising:
 a fixing portion having a first sidewall and a second sidewall formed on the plate; and
 a latch formed between the first and second sidewalls, the latch comprising a main body, two slanting elastic arms extending from two lateral ends of the main body toward the first and second sidewalls respectively, two latching portions formed on top portions of the elastic arms respectively, and the latching portions extending toward directions contrary to extending directions of the corresponding elastic arms, wherein one of the slanting elastic arms extends toward the first sidewall to allow the latching portion formed thereon to be clear of a path of one of the wires entering a slot formed between said one of the slanting elastic arms and the second sidewall and is deformable toward the second sidewall, when the other one of the wires is pressed and secured in a slot formed between said one of the slanting elastic arms and the first sidewall, to allow the latching portion formed on said one of the slanting elastic arms pressing against a top portion of said one of the wires toward the plate; the other one of the slanting elastic arms extends toward the second sidewall to allow the latching portion formed thereon to be clear of a path of said other wire entering a slot formed between said other one of the slanting elastic arms and the first sidewall and is deformable toward the first sidewall, when said one of the wires is pressed and secured in a slot formed between said other one of the slanting elastic arms and the second sidewall, to allow the latching portion formed on said other one of the slanting elastic arms pressing against a top portion of said other wire toward the plate.

2. The wire holder as claimed in claim 1, wherein the latching portions are formed on free ends of the elastic arms respectively.

3. The wire holder as claimed in claim 1, wherein two flanges are formed on the elastic arms respectively toward the extending directions of the corresponding elastic arms.

4. The wire holder as claimed in claim 3, wherein the flanges are formed on free ends of the elastic arms respectively configured to bias the wires against the first and second sidewalls respectively.

5. The wire holder as claimed in claim 1, wherein two apertures are defined in the plate between the first and second sidewalls, a connecting portion is formed between the apertures, and the main body is formed on the connecting portion.

6. The wire holder as claimed in claim 5, wherein the elastic arms are cantilevers cantilevering over the apertures respectively.

7. A wire holder fixing two wires on a plate of an electronic device, the wire holder comprising:
 two sidewalls formed on the plate along a first direction parallel to the plate; and
 a latch disposed between the sidewalls to divide a space between the sidewalls into two guiding slots for respectively receiving the wires, the latch comprising a main body with two opposite ends in the first direction, and two elastic arms extending from the two opposite ends of the main body to respectively provide clamping force along a second direction, the second direction being perpendicular to the first direction on a same plane, each of the elastic arms forming a latching portion on a top portion thereof, the latching portions extending toward the sidewalls respectively and cooperating with the plate to sandwich the wires therebetween in a third direction perpendicular to the first and second directions.

8. The wire holder as claimed in claim 7, wherein the latching portions are formed on free ends of the elastic arms respectively.

9. The wire holder as claimed in claim 7, wherein two flanges are formed on the elastic arms opposite to the latching portions respectively configured to respectively provide the clamping force along the second direction, and the clamping forces are toward the sidewalls respectively.

10. The wire holder as claimed in claim 7, wherein the elastic arms slantingly extend toward the sidewalls respectively.

11. The wire holder as claimed in claim 7, wherein the elastic arms are cantilevers.

12. The wire holder as claimed in claim 7, wherein two apertures are defined in the plate between the sidewalls, a connecting portion is formed between the apertures, and the main body is formed on the connecting portion, the elastic arms cantilevering over the apertures respectively.

13. A wire holder fixing two wires on a plate of an electronic device, the wire holder comprising:
 first and second sidewalls formed on the plate along a first direction parallel to the plate; and
 a latch disposed between the sidewalls to divide a space between the sidewalls into two guiding slots respectively receiving the wires therein, the latch comprising a main body having two opposite ends in the first direction, and two elastic arms extending slantly from the two opposite ends of the main body away from each other, each of the elastic arms having a latching portion formed on a top portion thereof, one of the wires being sandwiched between the first sidewall and one of the elastic arms in a second direction to deform the one of the elastic arm toward the second sidewall such that the latching portion formed on the one of the elastic arm presses against a top portion of the other wires, the other one of the wires being sandwiched between the second sidewall and the other one of the elastic arms in the second direction to deform the other one of the elastic arms toward the first sidewall such that the latching portion formed on the other one of the elastic arms presses against a top portion of the one of the wires, the second direction being perpendicular to the first direction.

14. The wire holder as claimed in claim 13, wherein the one of the elastic arms is restorable to move toward the first sidewall, when one portion of the one of the wires sandwiched between the first sidewall and the one of the elastic arms is pulled up in a third direction away from the slot, to remove the latching portion formed on the one of the elastic arms from the other wire such that the other wire is removable away from the slot, the third direction being perpendicular to the first and second directions.

* * * * *